July 17, 1956 W. M. SCHOLL 2,755,196
METHOD OF MAKING ADHESIVE TAPE WITH CLEAR MARGINS
Filed Aug. 1, 1952
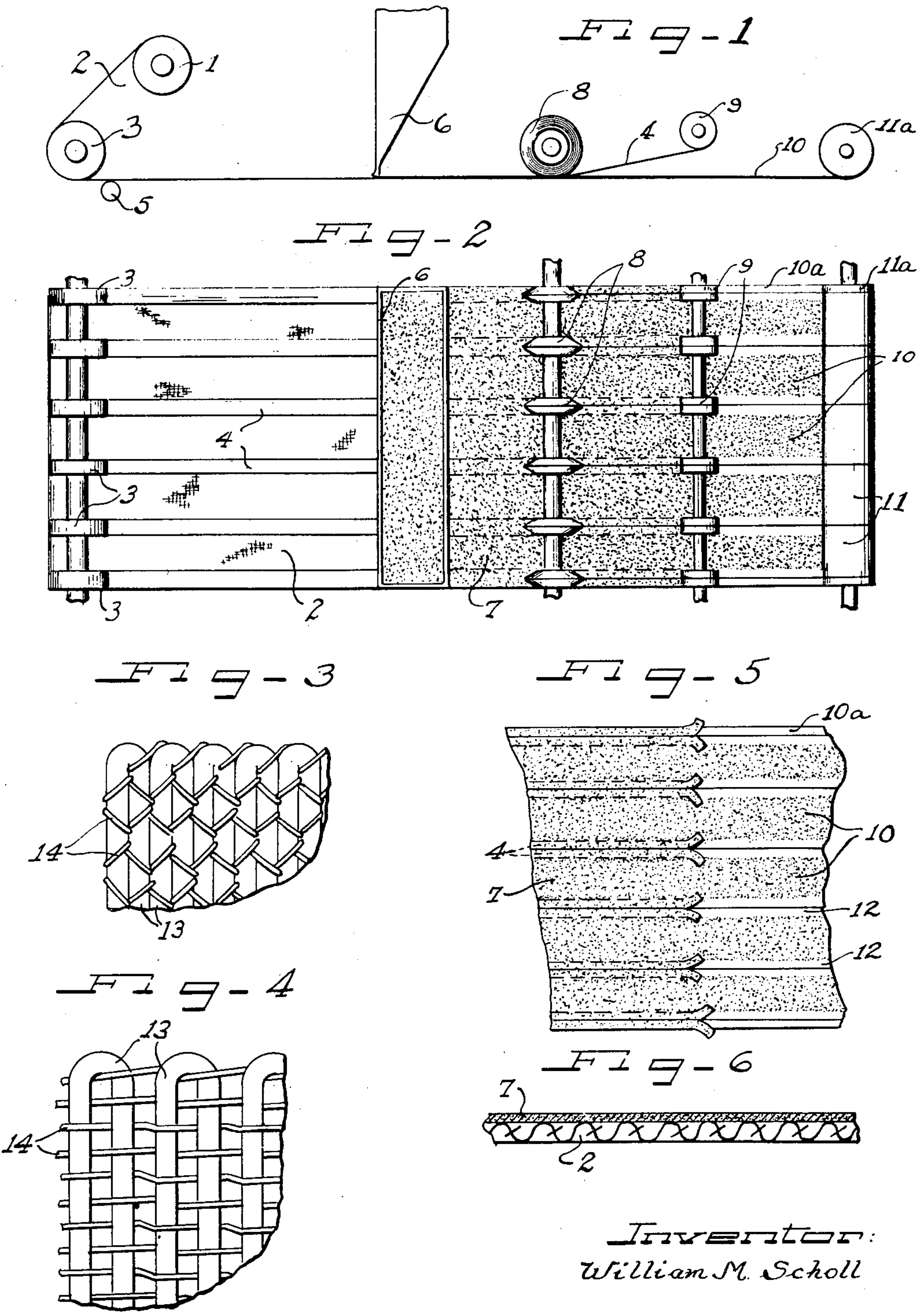
Inventor:
William M. Scholl
by Hill, Sherman, Meroni, Gross & Simpson Attys

United States Patent Office 2,755,196

Patented July 17, 1956

2,755,196

METHOD OF MAKING ADHESIVE TAPE WITH CLEAR MARGINS

William M. Scholl, Chicago, Ill.

Application August 1, 1952, Serial No. 302,089

3 Claims. (Cl. 117—4)

This invention relates to improvements in adhesive tape and a method of making the same, and more particularly to adhesive tape for attachment to the human body as well as other and various surfaces, the tape having clean marginal portions along each side thereof devoid of an adhesive mass, although the tape may have other features and functions as will be apparent to one skilled in the art.

In the past, extreme difficulty has been experienced in an endeavor to manufacture adhesive tape with opposed marginal portions of the tape devoid of adhesive, this being particularly true where the adhesive was of the so-called pressure sensitive variety, that adheres on contact with mild pressure. This difficulty was even greater in connection with adhesive tape of the stretchable character, wherein the fabric employed for the tape proper could be stretched if desired. Various methods of providing such tape have been heretofore developed, but in every instance of which I am aware, these formerly known methods were prohibitively expensive. Furthermore, tape of this character heretofore known did not have sufficiently clean margins to be satisfactory both from a practical and from an appearance standpoint of view, and in many cases the margins were not sufficiently clean to prevent exudation of adhesive at different spots.

With the foregoing in mind, it is an object of the instant invention to provide an adhesive tape having clean marginal portions along the sides thereof devoid of the adhesive mass.

Another object of this invention is the provision of an adhesive tape, which may be of the stretchable type, and which is provided with clean uniform margins along each side thereof free of adhesive material.

It is also an object of this invention to provide a new and novel method of making adhesive tape having clean margins free of adhesive material along the side edges of the tape, with the adhesive mass being confined to the greater central region of the tape.

Still a further object of the invention resides in the provision of a method of making adhesive tape, which may be of the stretchable type, and which method results in the provision of such tape having clean and uniform marginal portions free of adhesive material along each side of the tape.

Still another feature of the invention resides in the provision of a method of making an adhesive tape having clean marginal portions along the side edges, which method is simple and economical to practice.

While some of the more salient features, characteristics and advantages of the instant invention have been above pointed out, others will become apparent from the following disclosures, taken in conjunction with the accompanying drawing, in which—

Figure 1 is a diagrammatic fragmentary illustration of means for and a method of making the instant invention;

Figure 2 is a fragmentary plan view of the showing in Fig. 1;

Figure 3 is a fragmentary plan view of a portion of the fabric forming the tape backing, showing the same in a contracted condition;

Figure 4 is a view similar in character to Fig. 3, but showing the backing in an expanded or stretched condition;

Figure 5 is a fragmentary plan view of the tape nearing completion, but with the apparatus removed to better clarify a step in the method; and Figure 6 is a fragmentary, greatly enlarged, vertical sectional view taken lengthwise through a strip of completed tape.

As shown on the drawings:

Apparatus for performing the instant method is diagrammatically illustrated in Figs. 1 and 2. This apparatus includes a supply roll 1 for an elongated sheet 2 of fabric tape backing. This sheet 2 may be of any desired width and is usually thirty inches or more in width. The fabric sheet 2 passes around a series of supply rolls 3 each carrying a strip of relatively narrow masking tape 4 and as the fabric strip 2 turns over the supply rolls 3 the masking tape is spread along lengthwise of the sheet 2 as indicated in Fig. 2. Any suitable number of backing rolls such as is indicated at 5, or any suitable form of bed plate may be utilized with the apparatus.

Where the original sheet 2 has clean and straight edges the end supply rolls 3 may be only half the width of the intermediate rolls because these are at the extreme marginal portions of the sheet 2 and need only cover one ultimately blank margin, while the intermediate strips cover two ultimately blank margins. However, since most stock sheets have irregular side edges, it is preferable to use full size strips of masking tape at the margins and ultimately sever these strips centrally to insure true edges on the outer ribbons of finished tape, even though there be a waste margin.

The backing sheet 2 together with the strips and masking tape thereon next passes beneath a supply hopper 6, or any other suitable apparatus, for supplying and evenly spreading an adhesive mass 7 over both the backing sheet 2 and the strips of masking tape 4 thereon. The composite structure bearing the adhesive mass next passes beneath a series of cutting rolls 8 which sever the intermediate strips of masking tape centrally thereof, cutting entirely through the backing sheet 2 at the same time.

The cutter rolls are spaced apart at whatever distance is desired in accordance with the ultimately desired width of adhesive tape strips. In other words, some of the cutting rolls may be positioned to sever three-quarter inch strips of adhesive tape, while other rolls sever inch widths, inch and a half widths, two inch widths, etc.

After leaving the cutting rolls, the composite sheet passes beneath a series of pickup rolls 9 upon which the severed strips of masking tape are wound. The masking tape by virtue of the adhesive mass on the top side thereof is easily wound around these rolls as indicated more clearly in Fig. 1, since the strength of the adhesive mass is far greater than the strength of the adhesive on the masking tape strips. The severed strips of finished tape 10 are then wound on individual rolls 11 in predetermined lengths for packaging, the marginal waste **10*a* being accumulated on narrow waste rolls or spools 11*a***.

In Fig. 5 I have indicated diagrammatically the lifting of the masking tape strips from the composite adhesive covered assembly, and it will be seen that upon the removal of the masking tape strips, the finished adhesive tape has a clean marginal portion 12 along each side thereof with the adhesive mass between those clean margins. These margins are utterly devoid of adhesive mass, and so the tape may readily be used without fear of any exudation of the mass binding overlapping layers of the tape or coming in contact with the apparel of the user, if the tape is used on the human body.

Preferably the backing 2 may be of paper, plastic, fabric, or any other suitable material, but is preferably a stretchable fabric on the order of that illustrated in the magnified showings in Figs. 3 and 4. With this particular fabric the cross threads 13 are preferably larger than the longitudinal threads 14, and the longitudinal threads are preferably tightly twisted so that they inherently tend to assume the position seen in Fig. 3 with the cross threads 13 almost in abutment with each other. However, the fabric may be stretched to the position seen in Fig. 4, and because of the inherent tendency of the twisted threads 14 to contract to the position of Fig. 3, the fabric has great restorative powers, even though no specifically elastic material is embodied in the construction of the fabric. Extreme difficulty has been experienced heretofore in endeavoring to apply an adhesive mass to fabric of this character, and yet leave a portion of the surface to which the adhesive is applied free and devoid of the adhesive. With the instant invention, however, this is readily, easily, and economically accomplished.

The masking tape 4 is preferably of a very economical brand, and may be satisfactorily made of a thin paper, with a light coating of pressure sensitive adhesive thereon. Obviously, the adhesive on the masking tape must be far less in strength than the adhesive mass 7 applied to the backing 2 and over the masking tape, so that the masking tape may readily be removed by the rolls 9.

It will be understood that modifications and variations may be effected without departing from the scope of the novel concepts of the present invention.

I claim as my invention:

1. The method of making adhesive tape having clean margins devoid of adhesive along each side, including the steps of moving a backing sheet along a predetermined path, applying adhesive faced masking tape strips tightly to the surface of said backing sheet by the adhesive on the strips, said strips being spaced transversely of the sheet and maintained moving along with the sheet, applying an adhesive mass over said sheet and strips, severing the sheet lengthwise by cutting centrally through the masking tape strips, and removing the strips from the divided sheet to leave the margins of each sheet division clean and devoid of the adhesive mass, all while the sheet and strips are continuously moving.

2. The method of making stretchable adhesive tape having clean margins, including the steps of moving a backing sheet of stretchable fabric along a predetermined path while the sheet is in a relaxed state, applying narrow strips of adhesive faced non-stretchable masking tape tightly to the moving sheet by the adhesive surfaces, said masking tape strips moving along with said sheet and being spaced transversely of the sheet, covering both the sheet and strip with an adhesive mass, dividing the sheet lengthwise while cutting centrally through the masking tape strips, removing the strips from the fabric sheet, and winding the divided fabric sheet into separate rolls of predetermined length, all while maintaining the sheet and strips in continuous motion.

3. The method of making adhesive tape having clean margins devoid of adhesive along each side, including the steps of moving a backing sheet along a predetermined path, tightly adhering masking tape strips having an adhesive undersurface to the upper face of said sheet, said strips being spaced transversely of the sheet and maintained in motion therewith, depositing a layer of adhesive over the upper faces of said sheet and said strips, dividing the sheet lengthwise while cutting centrally through the strips, removing the strips from the sheet, and winding the divided portions of the sheet into rolls of predetermined length, all while maintaining the sheet and strips in uniform continuous motion.

References Cited in the file of this patent

UNITED STATES PATENTS

| | | |
|---|---|---|
| 1,581,040 | Vannote | Apr. 13, 1926 |
| 1,739,296 | DuPont | Dec. 10, 1929 |
| 1,831,764 | Evans | Nov. 10, 1931 |
| 1,923,513 | Steinert | Aug. 22, 1933 |
| 2,049,030 | Strauss | July 28, 1936 |
| 2,082,599 | Sawyer | June 1, 1937 |
| 2,089,525 | Abrams et al. | Aug. 10, 1937 |
| 2,152,012 | Albion | Mar. 28, 1939 |
| 2,349,709 | Evans | May 23, 1944 |
| 2,349,710 | Evans | May 23, 1944 |
| 2,364,607 | Dreher | Dec. 12, 1944 |
| 2,500,549 | Ketay et al. | Mar. 14, 1950 |
| 2,590,557 | Melsheimer | Mar. 25, 1952 |